(12) United States Patent
Weirauch

(10) Patent No.: US 9,021,197 B2
(45) Date of Patent: Apr. 28, 2015

(54) DRIVE INDICATING MECHANISM FOR REMOVABLE MEDIA

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 11/561,314

(22) Filed: Nov. 17, 2006

(65) Prior Publication Data

US 2007/0076535 A1 Apr. 5, 2007

Related U.S. Application Data

(63) Continuation-in-part of application No. 11/166,845, filed on Jun. 24, 2005.

(51) Int. Cl.
G06F 12/00 (2006.01)
G06F 13/00 (2006.01)
G06F 13/28 (2006.01)
G11B 19/04 (2006.01)
G11B 20/10 (2006.01)

(52) U.S. Cl.
CPC ................ *G11B 19/04* (2013.01); *G11B 20/10* (2013.01)

(58) Field of Classification Search
None
See application file for complete search history.

(56) References Cited

U.S. PATENT DOCUMENTS

| | | | | |
|---|---|---|---|---|
| 5,297,258 A * | 3/1994 | Hale et al. | | 711/114 |
| 5,940,854 A | 8/1999 | Green, Jr. et al. | | |
| 6,600,614 B2 * | 7/2003 | Lenny et al. | | 360/31 |
| 6,625,732 B1 * | 9/2003 | Weirauch et al. | | 726/26 |
| 7,031,085 B2 * | 4/2006 | Miller et al. | | 360/48 |
| 7,805,563 B2 * | 9/2010 | Topham | | 711/111 |
| 2001/0002846 A1 | 6/2001 | Onishi | | |
| 2002/0126992 A1 * | 9/2002 | Sakuramoto | | 386/77 |
| 2006/0026432 A1 | 2/2006 | Weirauch et al. | | |
| 2006/0123190 A1 | 6/2006 | Weirauch et al. | | |
| 2006/0291084 A1 | 12/2006 | Weirauch | | |
| 2009/0024795 A1 * | 1/2009 | Kobara | | 711/118 |

FOREIGN PATENT DOCUMENTS

| | | |
|---|---|---|
| CN | 1426063 A | 6/2003 |
| JP | 04017160 A | 1/1992 |
| JP | 11185383 A | 7/1999 |
| JP | 2000-010876 A | 1/2000 |
| JP | 2004-134044 A | 4/2004 |
| JP | 2006-050017 A | 2/2006 |
| JP | 2006-079733 A | 3/2006 |
| JP | 2006-164283 A | 6/2006 |

OTHER PUBLICATIONS

Wikipedia. Universal Serial Bus. Version as of Jun. 24, 2004. Retrieved on May 11, 2009. http://en.wikipedia.org/wiki/Universal_Serial_Bus.*

* cited by examiner

*Primary Examiner* — Yaima Rigol
(74) *Attorney, Agent, or Firm* — Hewlett-Packard Patent Department

(57) ABSTRACT

An optical disk system comprises a computer-readable medium containing code for controlling writing by the disk system to a removable optical disk. The optical disk system further comprises an optical pickup unit for reading data from the optical disk and writing data to the optical disk, a spindle motor for rotating the optical disk during the reading and writing, an optical disk controller that processes the data read from and written to the disk; and a processor that executes the code, thereby causing the optical disk system to write user data to the removable optical disk and to write an identifying value indicative of the optical disk system to at least one predetermined area of the removable optical disk.

20 Claims, 7 Drawing Sheets

DRIVE INDICATING MECHANISM FOR REMOVABLE MEDIA

CROSS REFERENCE TO RELATED APPLICATIONS

This application is a continuation in part of application Ser. No. 11/166,845, filed Jun. 24, 2005.

BACKGROUND

Some electronic systems include a storage drive that can store data on a removable storage medium. Because the storage medium is removable, the data on the storage medium can be written by one or more storage drives. Further, one or more portions (e.g., sectors) of a storage medium may malfunction. The malfunction may be caused by the storage medium itself or by a drive while accessing the storage medium. Having information by which such malfunctions may be diagnosed would be desirable.

BRIEF DESCRIPTION OF THE DRAWINGS

For a detailed description of exemplary embodiments of the invention, reference will now be made to the accompanying drawings in which:

FIG. 3 shows an exemplary embodiment of the drive identifier table of FIG. 2;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The verb "record" means to store, write, or otherwise transfer data onto a storage medium. The term "system" refers to a collection of two or more components and may be used, for example, to refer to a computer system or a subsystem of a computer (e.g., a storage drive).

DETAILED DESCRIPTION

Figure 1:
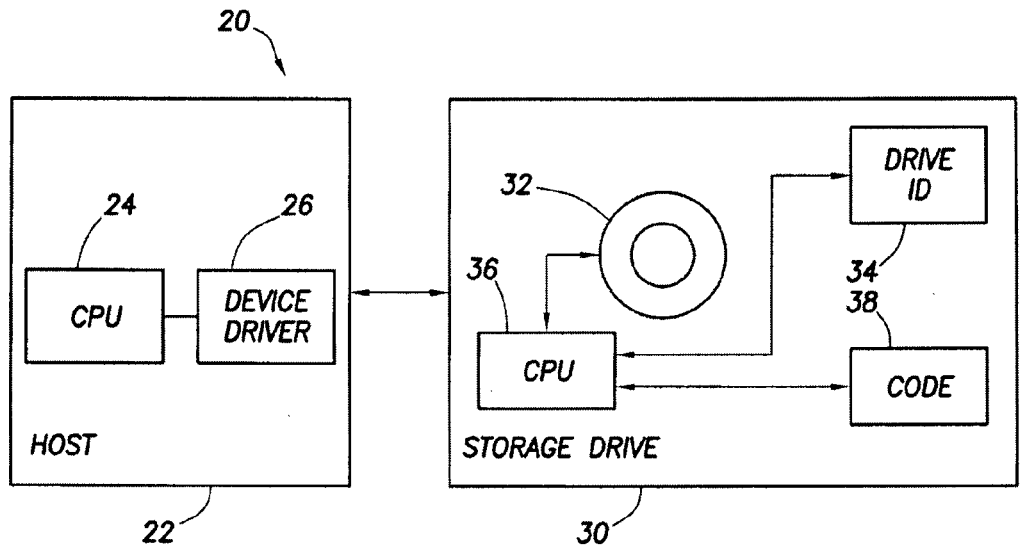
FIG. 1 shows a system in accordance with an exemplary embodiment of the invention.

FIG. 1 illustrates a system 20 implemented in accordance with an exemplary embodiment of the invention. As shown, system 20 comprises a host 22 coupled to a storage drive 30. In general, the host 22 stores data on, and reads data from, the storage drive. As such, the host 22 represents a source of data for the storage drive and/or represents a consumer of data retrieved from the storage drive for use by the host 22 or other device. The host 22 may be implemented as a computer and the storage drive 30 may be external to the computer or may be located internal to the computer. The host 22 includes a central processing unit ("CPU") 24 and a device driver 26. The device driver 26 comprises software that is executed by the CPU 24 and may cause the CPU to perform one or more of the actions described herein. The host 22 may also contain other components not specifically shown for sake of clarity.

The storage drive 30 is adapted to receive a removable storage medium 32 as may be inserted by a person or by a machine (e.g., an automated, tape drive loading system). The storage medium 32 may comprise any suitable type of medium such as an optical disk, a magnetic disk, solid state memory, etc. Further, the storage medium may be implemented as a "write-once" medium or a "re-writeable" storage medium. Data can be recorded onto a write-once medium more than once, but once data is written to a write-once medium (e.g., CD-R), such data cannot be overwritten or erased. Data on a re-writeable storage medium can be overwritten or erased.

The storage drive 30 may also include a CPU 36 and code 38 that can be executed by the CPU 36. One or more of the acts described herein may be performed by the storage drive's CPU 36 executing the code 38. Moreover, all of the acts described herein may be performed by the code 38 or by the device driver 26. In other embodiments, some of the acts described herein may be performed by the device driver 26 while other acts are performed by the code 38. The following discussion refers to the code 38 performing various actions, but in other embodiments device driver 26 may additionally or alternatively be used.

The storage drive 30 also comprises an identifying value such as a drive identifier ("ID") 34 that may uniquely identify the associated drive apart from all other drives. For example, the drive ID may comprise a serial number assigned by the drive manufacturer. In other embodiments, the drive ID 34 may be unique to at least some, but not all, other drives. It is generally sufficient for purposes of the subject matter disclosed herein that the drive ID 34 is such that there is a sufficiently low probability that the same storage medium 32 may be used in two or more drives having the same drive ID. The term "unique" (as in "unique" drive ID) is used in both contexts in this disclosure. The drive ID 34 may be stored in non-volatile memory in the storage drive 30 or may be hard-coded into the drive's circuitry (e.g., in unique patterns on traces formed on a printed circuit board contained in the drive). In some embodiments, the drive ID is permanent and thus not alterable. It is also suitable for the drive ID to be permanent, or at least difficult to alter without specialized equipment or processes. In other embodiments, the drive ID comprises an identifier of the host 22 instead of, or in addition to, an identifier of the drive. Further still, the drive ID comprises publicly available information pertaining to the system 10 or a user of system 10. The drive ID may additionally or alternatively contain private information that is lawfully retrievable pursuant to a valid legal process (e.g., a search warrant) to protect the privacy of a user of the system 10.

The drive ID 34 may comprise a value containing alphanumeric characters and/or other symbols. In at least one embodiment, the drive ID 34 comprises a 64-bit value comprising a manufacturer code (16 bits), a model code (16 bits) and a serial number (32 bits). Each different storage drive manufacturer may be assigned a unique manufacturer code and with 16 bits, there are more than 65,000 different manufacturer codes possible. Each different model, including revisions if desired, of a storage device may also be assigned a unique model code. With 16 bits used for the model code, there are more than 65,000 uniquely available model codes. The serial number generally is unique to each drive. As such, two drives of the same model and provided by the same manufacturer will still have different drive IDs because the serial number component of the drive IDs will differ. The three components of the drive ID (manufacturer code, model code, and serial number) may be concatenated together or otherwise combined or used together in any suitable manner.

In an alternative embodiment, every drive of a particular model may have the drive ID encoded in firmware running in the drives. In this embodiment, each drive of a particular model has the same 32-bit serial number. If the firmware is upgraded, the drive serial number is not changed and is still available. In accordance with another embodiment, the drive ID is generated by the host (e.g., by the CPU 24 in accordance with the device driver 26). When the drive is installed, the driver may prompt the operator for a number, which might, for example, be a human-readable serial number printed on the drive but not readable by the drive controller electronics. Alternatively, just the manufacturer number and model number could be manually entered and the device driver 26 could generate a random 32-bit serial number. Alternatively, the device driver could generate a serial number from a unique number associated with the host computer, such as a serial number of the firmware (e.g., BIOS) for the host. If the device driver provides the serial number, either the device driver should save the number in non-volatile memory, or the device driver should employ a deterministic algorithm to always recreate the same number every time the driver is loaded. If the device driver provides the serial number, the drive may obtain the drive identification from the device driver at initialization time.

In general, recorded data is formatted into addressable units that may be referred to in a variety of ways. Examples include sectors, blocks, clusters, tracks, and groups of other units such as an error correction code ("ECC") block which contains a predefined number of sectors. In the following discussion, the term "addressable unit" is used to generically refer to any of the units of storage listed above or other known units of storage.

Figure 2:
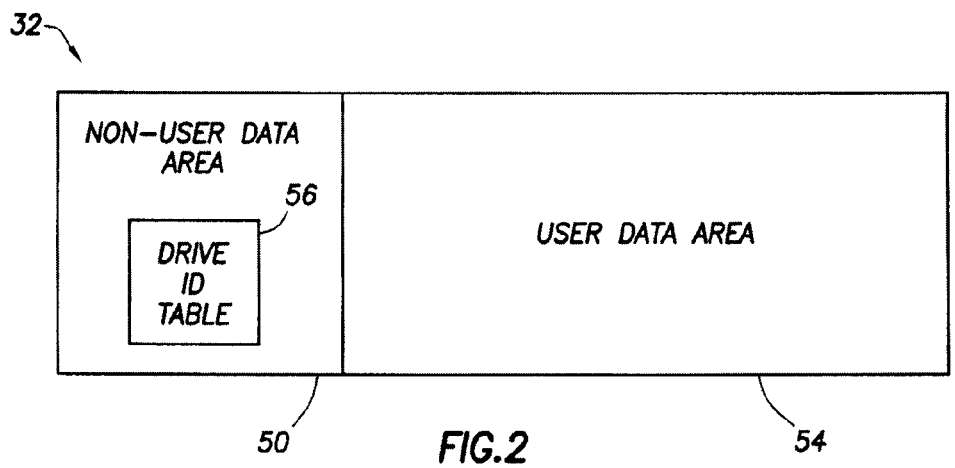
FIG. 2 illustrates an embodiment in which a drive identifier table is included on a storage medium.

FIG. 2 depicts an embodiment of the storage medium 32 as comprising a non-user data area 50 and a user data area 54. The user data area 54 is where data is stored by drive 30 on behalf of an application running on the host 22. For example, a file, such as a document or a spreadsheet, that a user desires to store on the storage medium is stored by the drive 30 in the user data area. The non-user data area 50 is generally unusable for storing user data and, instead, is used for control and administration purposes. In accordance with at least some embodiments of the invention, the non-user data area 50 may comprise a "lead-in" area of the storage medium such as that disclosed in U.S. Pat. No. 6,330,210, incorporated herein by reference. In the embodiment of Figure, the non-user data area 50 contains a drive ID table 56. The drive ID table 56 may be initialized by the drive's CPU 36, under execution of code 38. Initializing the drive ID table may comprise reserving a portion of the non-user data area 50 for storing the table.

FIG. 3 shows an embodiment of the table 56. The table 56 is configured to contain one or more entries 62. As shown in FIG. 3, each entry 62 comprises at least a drive ID field 58. The drive ID field 58 is adapted to store a drive ID (such as those described above) associated with a storage drive. Each entry 62 may also include an index field 60. As such, each entry 62 in the table 56 may include an index value and a corresponding drive ID. For example, index value 01 h ("h" indicating hexadecimal) corresponds to the ID for drive 1 (DRIVE 1 ID). Similarly, indices 02 h and 03 h correspond to DRIVE 2 ID and DRIVE 3 ID. At least some entries 62 may be reserved for future use to store drive IDs. In the embodiment shown in FIG. 3, an index field 60 is included in the table for storing index values. In other embodiments, index field 60 is not explicitly included in table 56 and, instead, the index value for each drive ID is inferred based on the location in the table of the drive ID value being referenced. For example, drive 2 is in the second entry (in a 0-based indexing scheme) of the table and thus is drive 2 is considered to be associated with an index value of 2.

In accordance with various embodiments of the invention, each time an addressable unit of the storage medium 32 is written with data by a storage drive 30, the storage drive's CPU 36, under control of code 38, also writes an index value into the addressable unit being written with data. The index value written into the addressable unit of the storage medium 32 corresponds to the particular storage drive 30 that is performing the write operation. The index value written to the addressable unit corresponds to the ID of the drive as reflected by way of the drive ID table 56. For example, if drive 1 writes an addressable unit of the storage medium, then, in addition to the data, drive 1 also writes its corresponding index value into the addressable unit. Moreover, each addressable unit of storage medium 32 in which data is written is also written with an index value that identifies the particular storage drive 30 that was used to write the addressable unit.

Figure 4:
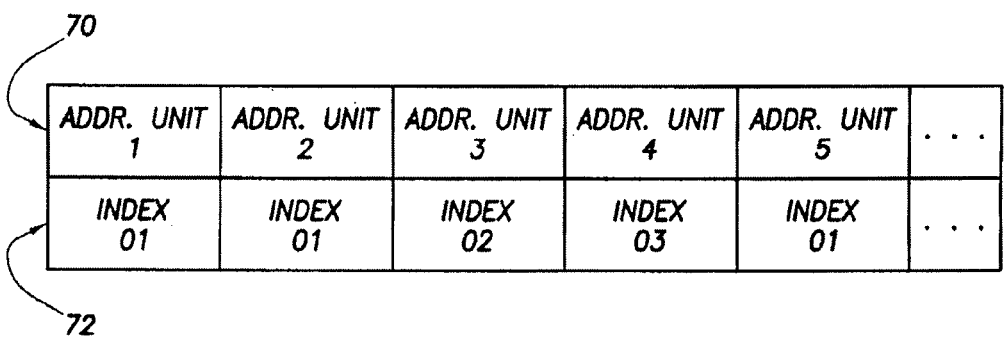
FIG. 4 shows an example of a portion of a storage medium in which index values identifying individual storage devices are stored in the addressable units of the medium.

FIG. 4 illustrates a portion of the addressable units of a storage medium 32. The portion shown in FIG. 4 includes addressable units 1, 2, 3, 4, and 5. Each addressable unit includes a data portion 70 and an index value 72. The index value 72 may be included as part of a header associated with each addressable unit. In some embodiments, an addressable unit header may include an address, control information, and other information as well as one or more reserved fields. One of the reserved fields may be used to store the index value. In the example of FIG. 4, drive 1 was used to write data to addressable units 1, 2, and 5 and drives 2 and 3 were used to write data to addressable units 3 and 4, respectively. Drive 1 may have also been used to write data to addressable units 3 and 4, but drives 2 and 3 subsequently overwrote whatever data may have been stored in addressable units 2 and 3, and accordingly updated the associated index values. The index values 72 identify the drives that have most recently written the addressable units. The storage medium 32 may also be used in conjunction with "legacy drives." A legacy drive is a drive that is not equipped to write a drive ID to the storage medium as described herein. Instead, a legacy drive may cause a predetermined value such as 00 h to be written to the location in the addressable unit at which a drive ID would otherwise be written by a drive as described herein.

It may happen that all of the entries in the drive ID table 56 are written with drive IDs and, if implemented in the table, index values. When this happens and in accordance with at least some embodiments, a new storage drive that attempts to write data to an addressable unit (i.e., a drive whose drive ID is not already stored in table 56) may cause a reserved value such as 00 h or FFh to be written to the addressable unit(s) instead of the drive ID. In other embodiments, once the table 56 becomes full, the drive IDs in the table can be erased by way of a user-initiated maintenance procedure. An offset value can then be stored as part of the table or elsewhere on the storage medium. This offset value represents the number of entries in the table 56 and is used to compute new indices for additional drives. For example, if the table 56 has 32 entries and all 32 entries are occupied with drive IDs (i.e., 32 drive IDs of 32 different drives), all 32 drive IDs can be erased from the table. In this example, the offset value will be 32. When a drive subsequently attempts to write to an addressable unit, that new drive, being the first drive to write the storage medium following the erasure of the table 56, will be assigned an index value of 33 which is computed by adding an initial index value of 1 to the offset value of 32. Similarly, the next drive to write the storage medium will be assigned an index value of 33, and so on. The index values actually stored in the table 56 will be 1, 2, 3, etc., but are added to the offset value 32 when the table 56 is accessed.

Figure 5:
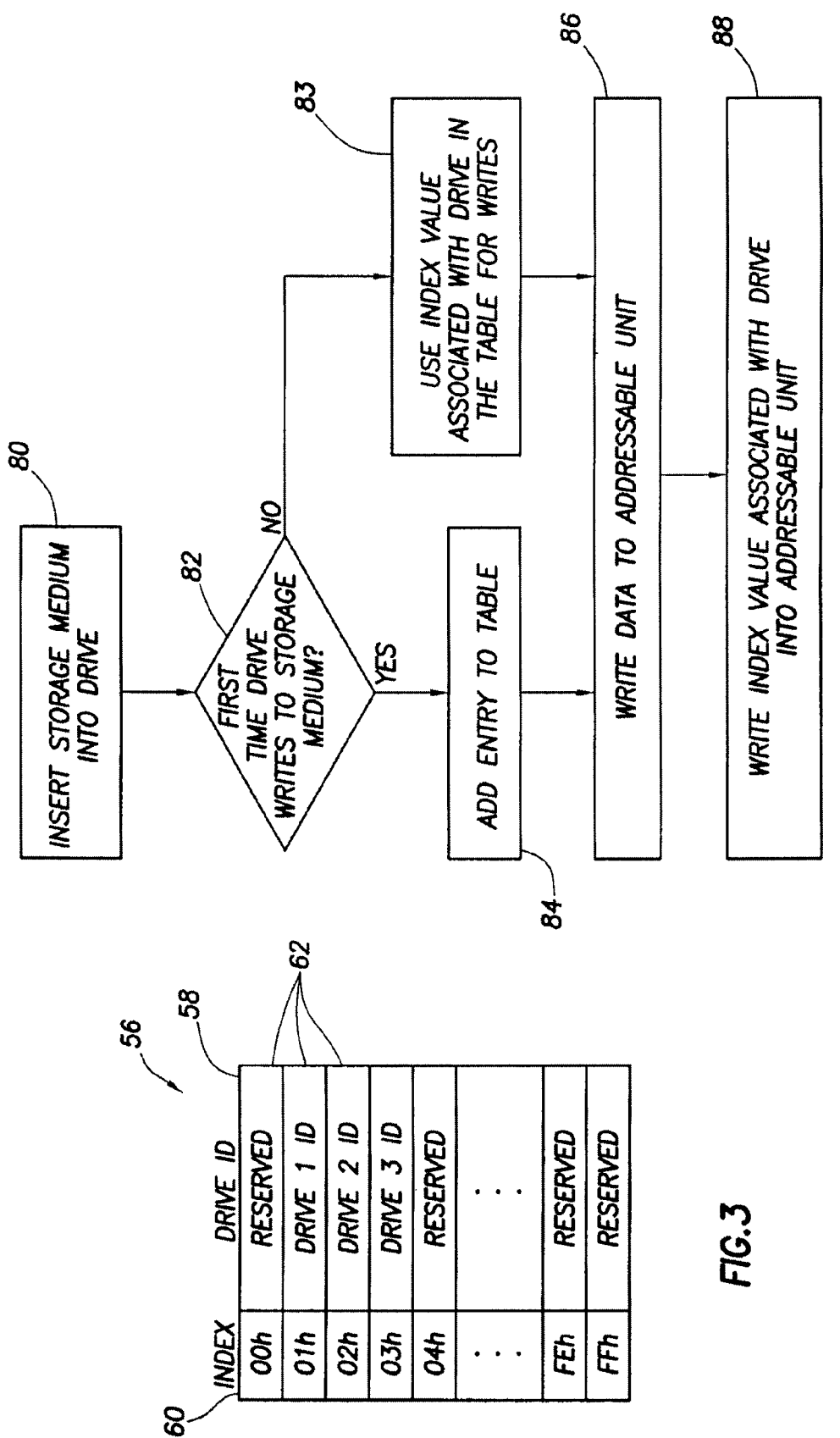
FIG. 5 shows an exemplary method embodiment.

FIG. 5 illustrates a corresponding method comprising blocks 80-88. One or more of the acts depicted in FIG. 5 can be performed concurrently or sequentially and one or more acts can be omitted as desired. Further, the acts can be performed in a different order than that shown in FIG. 5. At block 80, a user inserts a storage medium 32 into a storage drive 30. At some point, the storage drive 30 may write to the storage medium 32. At block 82, the storage drive 30 determines if that particular drive has previously recorded data to storage medium 32 by examining the storage medium's table 56. If the storage drive 30 has never before written data to the storage medium 32, then the drive ID of the storage drive 30 will not be present in table 56. However, if the storage drive 30 has previously written data to the storage medium 32, then the drive ID of the storage drive 30 will be present in table 56. If this is the first time this particular storage drive 30 has written data to this particular storage medium 32, then at block 84 the drive's CPU 36 modifies the storage medium's drive ID table 56 by adding the drive's ID value to the table corresponding to a previously unused index value. Such a drive, for example, may add its drive ID to the table at the entry corresponding to index value 04 h, which was previously marked as "reserved." If the drive already has written the storage medium 32, then the storage medium's drive ID table should already have an entry contained therein that lists the ID of the drive and at block 83, the drive's CPU will use the index associated with its drive's ID found in drive ID table 56. At block 86, the storage drive 30 writes data to the addressable unit on storage medium 32. At block 88, the drive 30 writes its index value to the addressable unit that is being written with data. In some embodiments, blocks 86 and 88 are performed as one act, that is, data and the drive ID are written to the addressable unit in one write transaction. In some instances, the drive ID table will not be updated prior to writing data and the drive's CPU 36 will keep track of new index value and wait to record it to the drive ID table 56 at some later point prior to ejecting the storage medium 32 or powering down the system. Any change to the drive ID table 56 is written before, during, or after writing data to the addressable units, but before ejecting the media from the storage drive.

In accordance with the embodiments described above, index values are stored in the addressable units as the identifying values by which to identify the drives writing the addressable units. The table 56 can be used to identify the particular drive that wrote an addressable unit given the associated index value. In some embodiments, the index value associated with a particular drive is stored in table 56 as shown in FIG. 3, but in other embodiments, the index value of a particular drive is inferred from that drive's location in the table. In some embodiments, the drive ID itself (or a system identifier) can be written to the addressable unit as the identifying value, rather than a corresponding index value. In this latter embodiment, the drive ID table (which facilitates a conversion between index values and drive IDs) is not used.

In some embodiments (e.g., legacy drives), a drive identifying value may not be available and a predetermined value (e.g., 00 h) is stored in the addressable unit of the medium. Also, it may be that all possible drive identifiers (e.g., index values) are already in use and thus none are available for a new drive. In this case, a predetermined value is used to store in the addressable unit of the medium in place of a drive-identifying index value.

The embodiments described above result in storage media that contain audit information that can be used to identify which drives wrote specific addressable units of the storage media. This audit information can be used in a variety of ways. For example, if an addressable unit of a storage medium 32 is determined to be defective and the index value written to that addressable unit can be determined, then, by examining the drive ID table, a determination can be made as to which drive last wrote to that particular addressable unit. The defect to the addressable unit may be caused by a problem with a particular storage device that can uniquely be identified by information in the addressable unit(s) written by the storage device and the medium's drive ID table. Accordingly, in some embodiments, a method may be performed by a computer system having a processor and executing software suitable to implement the method. The method so performed comprises retrieving information from the removable storage medium 32 and, based on the information, determining which of a plurality of storage drives was used to store the data on the removable storage medium. Specifically, the computer system receives the removable storage medium and the computer system's software is executed to perform the method to determine which one or more storage drives previously wrote data to the removable storage medium. The act of retrieving the information explained above comprises retrieving a table 56 from the removable storage medium. The act of retrieving the information also comprises retrieving any index values stored in the addressable units of the removable storage medium that have previously been written with data. The method further entails examining the table 56 and determining if any index value(s) read from any of the addressable units on the storage medium contain matches to any index values contained in the table. The drive IDs stored in the table provide a mechanism by which the identity can be ascertained of any drive that has previously written data to an addressable unit of the storage medium and whose index value is stored at such addressable unit.

Figure 6:
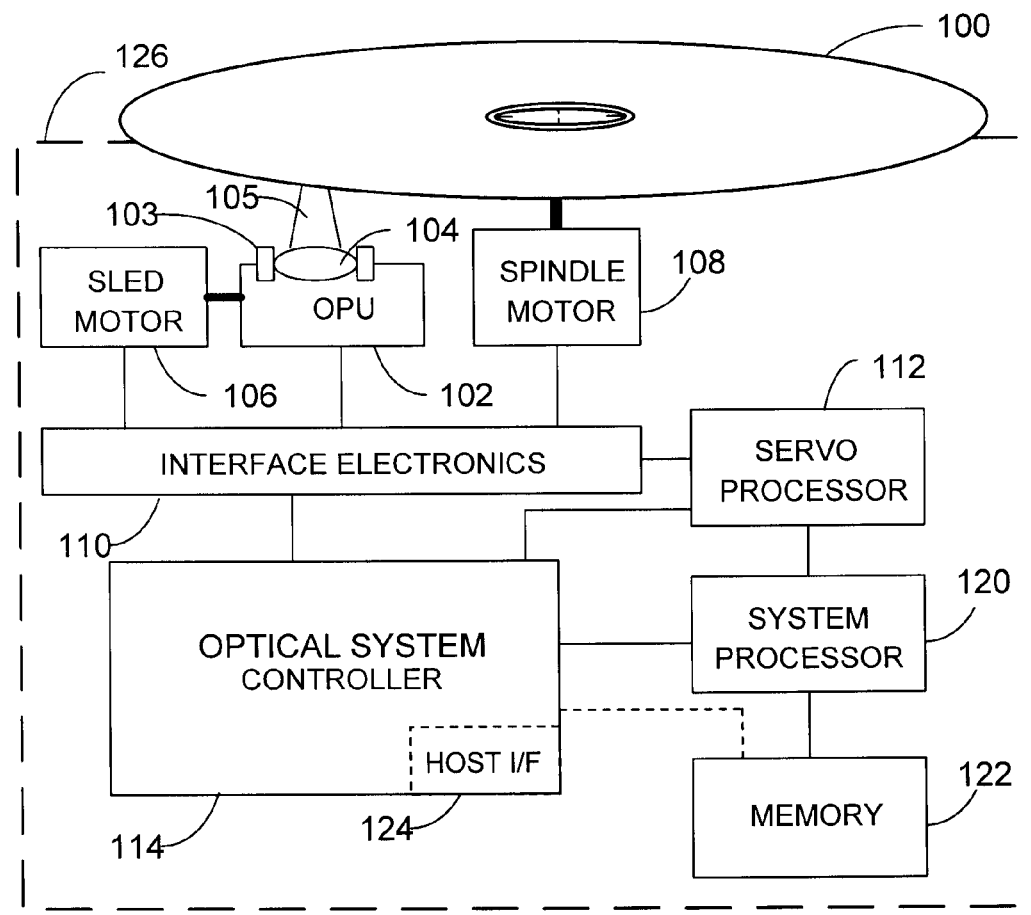
FIG. 6 shows an example of an optical disk system in accordance with an embodiment of the invention.

FIG. 6 is a functional block diagram of an example of an optical disk system in accordance with an embodiment of the invention. The system comprises a removable optical disk 100 and a drive 126. Drive 126 further comprises a spindle motor 108 connected to a clamping system for a removable optical disk 100. Information is read from or written on the disk 100 using an optical pickup unit (OPU 102), which comprises one or more lenses 104 and other optical elements as well as one or more laser diodes and photodetectors. Additionally, OPU 102 may comprise electromechanical elements 103 to move an objective lens 104 in the radial and axial directions for keeping a laser beam 105 focused on and following a track on optical disk 100. OPU 102 is mechanically attached to a sled motor 106, which is configured to move OPU 102 across the usable radius of the optical disk 100. Interface electronics 110 are used to condition and combine signals from the photodetectors in OPU 102 to create radial and focus signals for reading and writing and to create a signal for reading data. Additionally, the interface electronics control the laser diode in OPU 102 during reading and writing and condition signals for the sled motor 106 and the spindle motor 108. The focus and tracking signals are used by a servo processor 112 to adjust the lens 104 by the electromechanical means 103 in OPU 102 directly or using interface electronics 110 to maintain radial and axial tracking during reading and writing, and may also be used to control the velocity of spindle motor 108 while writing. An optical disk controller 114 decodes data from the photodetectors in OPU 102 and conditioned by interface electronics 110 and encodes data and modulates the laser power in OPU 102 through interface electronics 110. The optical disk controller 114 may also use the read data to adjust the spindle motor 108 velocity if the servo processor 110 does not contain that function. The optical disk controller 114 also comprises a host interface 124 for communicating with a host device. Host interface 124 may be a proprietary interface, or may be an industry-standard interface, such as a Serial Advanced Technology Attachment (SATA) interface, a Parallel Advanced Technology Attachment (PATA) interface (sometimes embodied as an "IDE" or "EIDE" interface), a Universal Serial Bus (USB) interface, an IEEE 1394 serial interface, an IEEE 1284 parallel interface, or another kind of standard interface. The components in the system are controlled by a processor 120 running code from memory 122.

The system of FIG. 6 is one example of an optical disk system in accordance with an embodiment of the invention, and other embodiments are possible. The functions described may be partitioned into different blocks. For example, the servo processor 110 may be combined into optical disk controller 114, or the processor 120 and memory 122 can be combined into a single integrated circuit.

In operation according to one example embodiment, the system, under control of processor 120 executing code from memory 122, writes user data to removable optical disk 100, and also writes an identifying value indicative of the optical disk system to at least one predetermined area of removable optical disk 100. Removable optical disk may be, in these embodiments, a rewriteable optical disk or a write-once optical disk.

In another example embodiment, the system determines whether the particular removable optical disk 100 has been previously written to by this particular optical disk system. For example, removable optical disk 100 may hold a table or other data structure containing a record of all of the particular optical disk drives that have written any data to disk 100. The system may simply read the table and compare its entries with identifying information about drive 126. If the system has not previously written data to removable optical disk 100, then the system may, in conjunction with writing data to disk 100, update the table or other data structure with an identifier associated with the identifying value written to the at least one predetermined area on disk 100.

Figure 7:
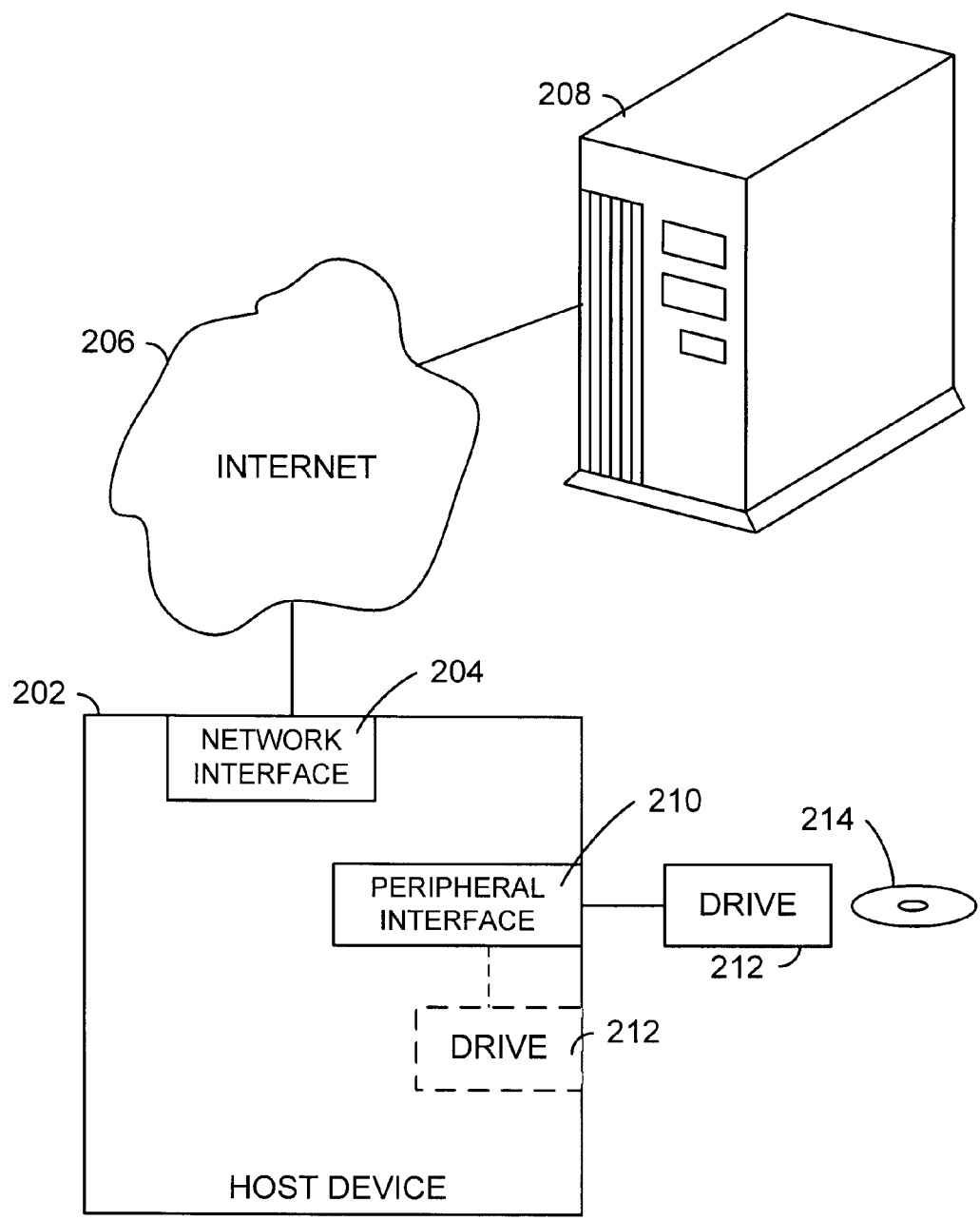
FIG. 7 illustrates an embodiment in which content used in the system is downloaded from or allowed by a network.

The user data to be recorded onto the optical disk 100 may come from one or more of various sources. For example, the user data may be created by the user of the system, or may be content downloaded via the internet as shown in FIG. 7. In FIG. 7, a host device 202, which may be a PC or standalone device, comprises a network interface 204 and a peripheral interface 210. Host device 202 communicates with one or more servers 208 connected to the internet 206 through network interface 204. Host device 202 sends data to and receives data from an optical disk drive 212 through a peripheral interface 210. Optical disk drive 212 may be internal to the host device (as shown in dashed lines in FIG. 7) or be an external device. Peripheral interface 210 may be a proprietary interface or a standard interface.

In operation according to one embodiment, host device 202 receives content by communicating with one or more servers 208 connected to the internet 206, and then writes the content as user data to an optical disk such as optical disk 214. In addition to writing the downloaded content, the system writes an identifying value to at least one predetermined area on the optical disk.

In addition to and in association with receiving the downloaded content, host device 202 may receive additional information through the network interface 204. This additional information may be related to the downloaded content, or may be related to the circumstances of the download. Examples of the additional information include information about the user, information about the system and or its components, keys for encryption or decryption of the content, or other information. It may include information about the download transaction, such as payment methods and may include time and location specific information about the download, creation or playback of the content. Additionally, the download may include digital rights management information for use in controlling use or dissemination of the content. One or more items of the additional information may be recorded on optical disk 214.

Figure 8A:
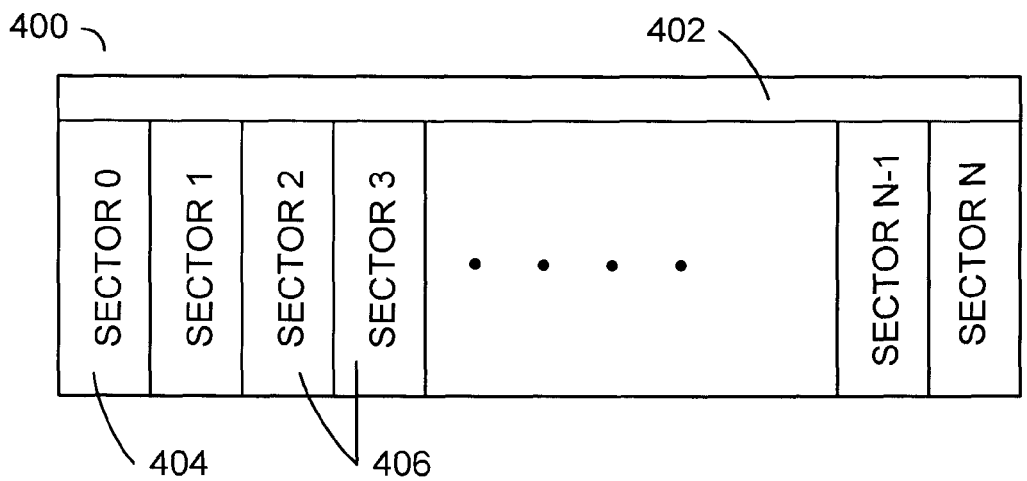
FIGS. 8A-8D show the layout of a block of information, in accordance with an example embodiment of the invention.
Figure 8B:
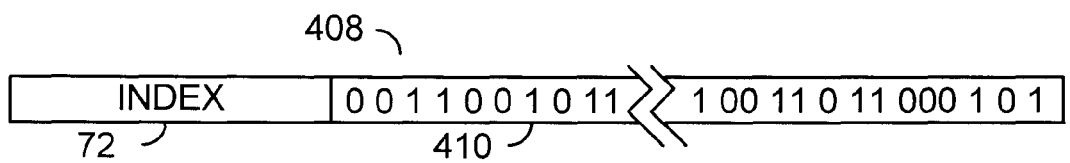
Figure 8C:
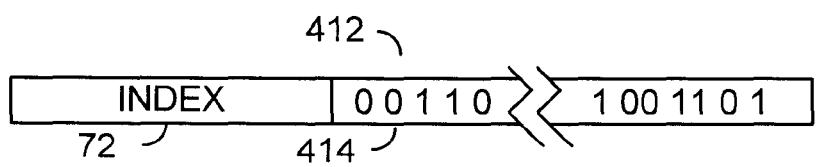
Figure 8D:
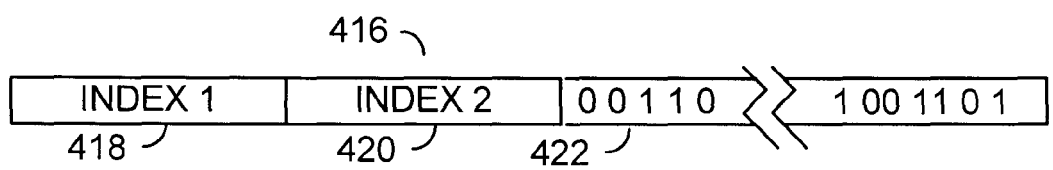

FIG. 8A shows a schematic view of the data sectors and address and control portion of an ECC Block. FIGS. 8B-8D show identifying information contained within an ECC block in accordance with example embodiments of the invention. The granularity of recording on optical media is typically limited by the smallest block of self contained information. The information includes addressing and control information, user data, and error detection and error correction bytes. Additionally, during modulation synchronization fields and padding bits may be added. This block, prior to modulation, is often referred to as an ECC Block 400 and contains, for example, sixteen 2048-byte user data sectors for DVD and thirty-two 2048-byte sectors 404 for Blu-ray and HD DVD. However, host systems may choose to write data to less than the total size of the ECC Block. In this case, the optical disk device may read the entire ECC Block, modify only sectors whose contents have changed and generate new error detection and error correction bytes and change control information 402, and then write the new ECC Block back to the disk. The address and control information 402 for the ECC block 400 may be dispersed throughout the block.

If only some changed sectors 406 are recorded with unchanged sectors, then identifying information can be contained within the address and control information 402 of the ECC Block 400 to distinguish those sectors. In one example embodiment, this can be indicated by an index 72 for the table 56 (illustrated in FIGS. 2 and 4) and a bit map or some other designation for the individual sectors assigned to that index. All other sectors would be considered of unknown origin. This arrangement is illustrated in FIG. 8B. Identifying information 408 comprises index 72 and bit field 410. Index 72 indicates an entry in a table of identifiers previously described. Example bit field 408 contains 1 bit for each sector in ECC block 400. When ECC block 400 is written, a bit in bit field 410 corresponding to each changed sector is set to a "1". The other bits are set to "0". (Of course, the sense of the bits could be reversed.) Identifying information 408 then indicates that at least some sectors in ECC block were most recently written by the drive, user, system or other entity identified by the table entry corresponding to index 72. The particular sectors changed by the most recent writing are the sectors whose corresponding bits are set to "1" in bit field 410. The other sectors are then of unknown origin, because only one index value is available for each ECC block in this example embodiment. Identifying information 408 may be comprised in address and control information 402, which may be distributed throughout ECC block 400.

If insufficient bits are available in bit field 410 to have each bit represent a single sector, then each bit may represent two or more sectors. This embodiment is illustrated in FIG. 8C. In FIG. 8C, bit field 414 in identifying information 412 contains only one bit for each two sectors in ECC block 400. The first bit, for example, may indicate whether during the most recent write operation either or both of the first two sectors in ECC block 400 were modified using the entity indicated in the table entry corresponding to index 72. The second bit of bit field 414 may indicate whether either or both of the second pair of sectors in ECC block 400 were modified, and so forth.

FIG. 8D illustrates an arrangement wherein a more complete history of modifying entities is kept. In FIG. 8D, identifying information 416 comprises two index values 418 and 420, and bit field 422. If sufficient bits are available, bit field 422 may comprise twice as many bits as ECC block 400 comprises sectors. Half the bits in bit field 422 would then indicate which sectors have been most recently written by the entity indicated by the table entry associated with the first index, and half the bits in bit field 422 would indicate which sectors have been most recently written by the entity indicated by the table entry associated with the second index. If insufficient bits are available for full individual-sector indication, then the bits may represent more than one sector as described above with respect to FIG. 8C. Many other arrangements and combinations are possible.

While the embodiments so far described have related to writeable storage media, a read-only medium may also comprise identifying information in accordance with an embodiment of the invention. Read-only media may include, for example media that is manufactured or replicated by mastering, molding, stamping, writing data to a write-once medium, or by some other means.

Figure 9:
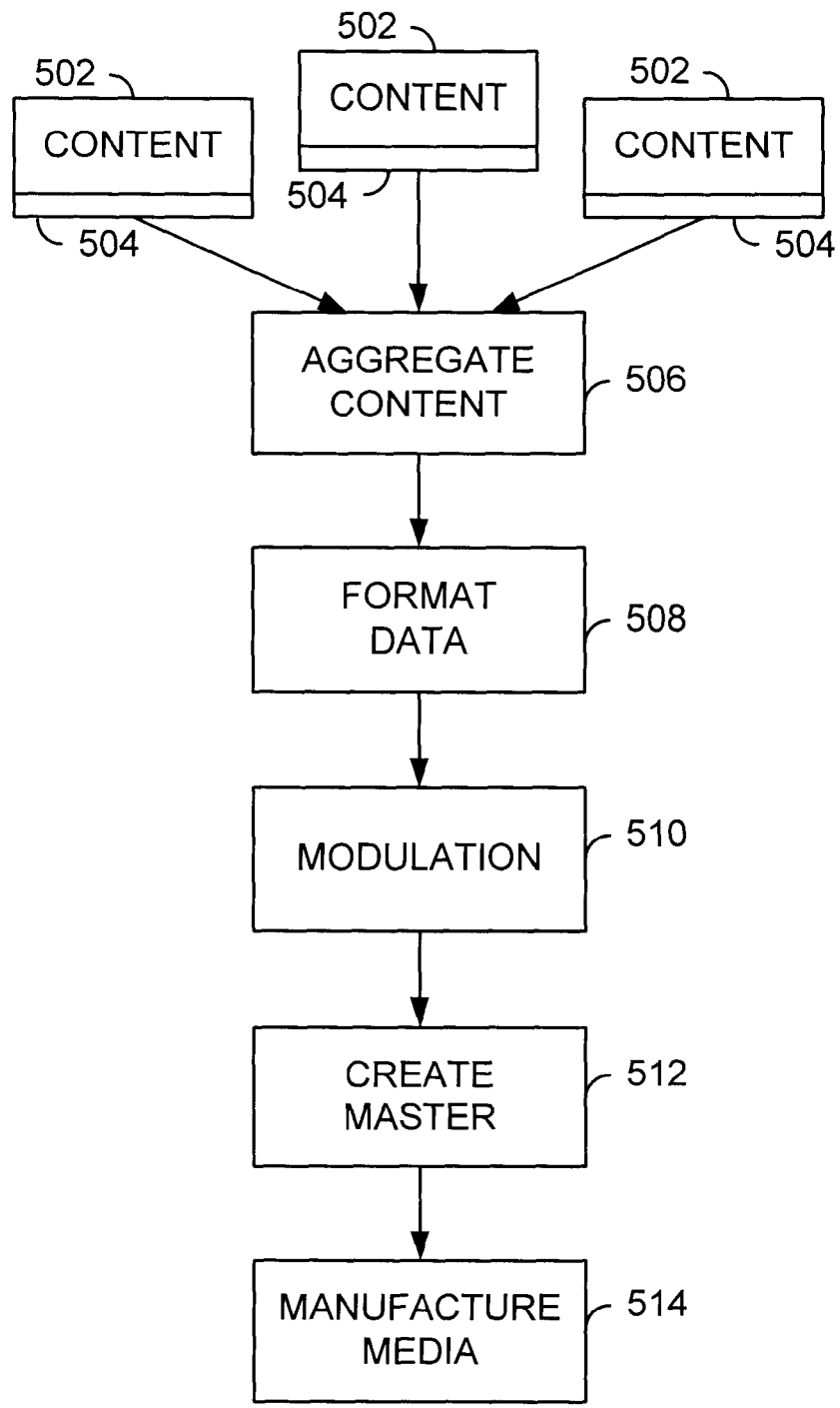
FIG. 9 illustrates an example schematic diagram of a method in accordance with an example embodiment of the invention for creating read-only media containing identifying information.

FIG. 9 illustrates a method for manufacturing read-only media according to an example embodiment of the invention. Note that FIG. 9 is not strictly a flow chart.

At step 506, content 502 from one or more sources is aggregated. Each portion of content may have associated distinguishing information 504. Content 502 may come from various sources (content creator, content distributor, or other source), be of various forms (audio, video, documents, data, or other forms), be created by different methods, and have different use requirements. Read-only media according to an embodiment of the invention may be especially useful when tracking or distinguishing content on an individually addressable unit basis is desirable. For example, a read-only optical disk may contain video content in various formats, and distinguishing information according to an embodiment of the invention may be used to distinguish which content on a disk is recorded in which format. Or distinguishing information may be used to indicate time-related information about the content such as the creation date of the content, or geographic location information, such as the geographic location at which a digital photograph was taken. The distinguishing information may indicate an owner of rights in the user data.

Data for the disk, including distinguishing information 504, is then formatted at step 508 for the disk layout including adding any additional information such as error correction bytes and addressing. The entire data from step 508 is then modulated in step 510 according to disk format modulation code. At step 510, additional bit level data such as synchronization fields can be added. A master is then created in step 512 which is used to manufacture individual media at step 514.

Figure 10A:
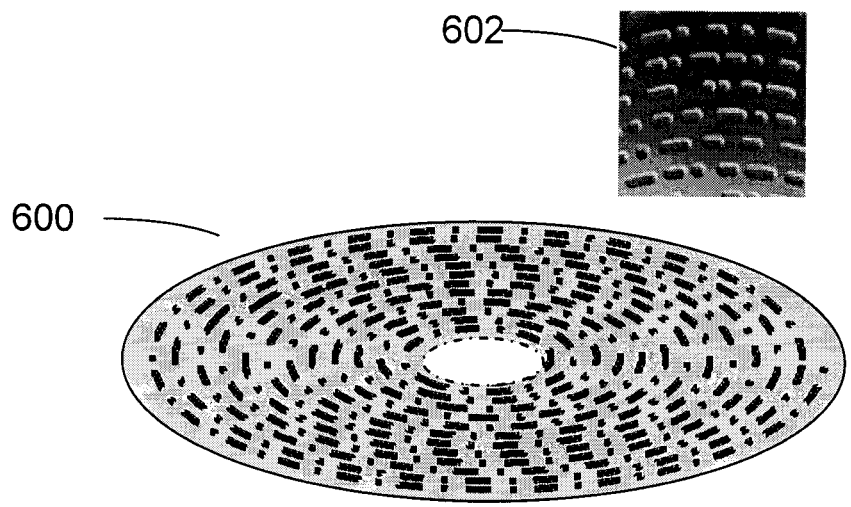
FIGS. 10A and 10B illustrate examples of read-only and writable optical disks in accordance with an embodiment of the invention.
Figure 10B:
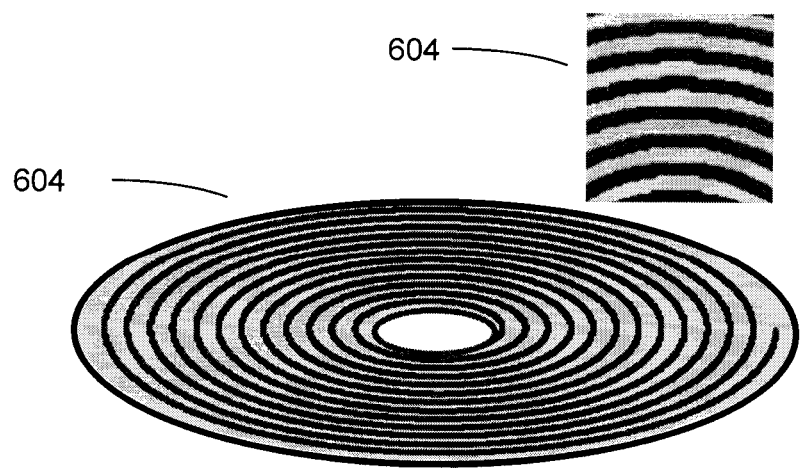

FIGS. 10A and 10B illustrate two examples of optical disks configured to contain identifying information, in accordance with an example embodiment of the invention. The examples are not to scale. FIG. 10A represents a read-only optical disk 600 that has been embossed, injection molded, or manufactured by other methods from a master to contain identifying information encoded in pits 602 on the media. FIG. 10B represents a recordable optical disk 604 comprising a track structure 606 where marks and spaces are created containing identifying information about the recording system. The track structure 606 contains addressing information necessary to locate the recording positions of the identifying information. The optical disk 604 is manufactured by embossing, injection molding or other methods to create the track structure 606 used to record or overwrite the media. While FIGS. 10A and 10B illustrates examples of single layer read-only and recordable optical disks, multi-layer disks are also possible.

Numerous variations and modifications will become apparent to those skilled in the art once the above disclosure is fully appreciated. For example, the teachings provided herein are applicable to computer systems as well as standalone storage devices such as optical disc video recorders.

What is claimed is:

1. An optical disk system including a computer-readable medium containing code for controlling writing by the disk system to a removable optical disk, the optical disk system comprising:
    an optical pickup unit for reading data from the optical disk and writing data to the optical disk;
    a spindle motor for rotating the optical disk during the reading and writing;
    an optical disk controller that processes the data read from and written to the disk; and
    a processor that executes the code, thereby causing the optical disk system to:
        determine whether the optical disk system has previously written data to the removable optical disk;
        if the optical disk system has not previously written data to the removable optical disk, store an index value and a corresponding identifier in a data structure in a predetermined area on the optical disk, the identifier uniquely identifying the optical disk system, wherein the data structure includes entries for a plurality of index value-identifier pairs; and
        write data and an index value to an addressable unit of the optical disk, the index value being an index value from the data structure corresponding to the optical disk system.

2. A system for storing downloaded content, comprising:
    a network interface configured to enable access to downloadable content;
    a host device configured to receive downloaded content through the network interface, the host device further comprising a peripheral interface; and
    an optical disk drive to connect to the host device through the peripheral interface and to receive a writeable optical disk including a plurality of addressable units and a predetermined area containing a data structure including a plurality of entries of index value-drive identifier pairs, and the optical disk drive is further to:

receive the downloaded content from the host device,
write the downloaded content to the addressable units;
determine whether the optical disk drive has previously written data to the writeable optical disk;
if he optical disk drive has not previously written data to the writeable optical disk, store an index value and a corresponding drive identifier into the data structure, the drive identifier uniquely identifying the optical disk drive or the host device; and
write an index value to an addressable unit of the removable optical disk, the index value being an index value from the data structure and corresponding to the host device or optical disk drive.

3. The system of claim 2 wherein the predetermined area is comprised in the addressable units.

4. The system of claim 2, wherein the peripheral interface is an industry standard interface.

5. The system of claim 4, wherein the peripheral interface is one of a Universal Serial Bus interface, an IEEE 1284 interface, an IEEE 1394 interface, and a Serial Advanced Technology Attachment interface.

6. The system of claim 2, wherein the peripheral interface is a proprietary interface.

7. The system of claim 2, wherein the writeable optical disk is a write-once optical disk.

8. The system of claim 2, wherein the writeable optical disk is a rewriteable optical disk.

9. The system of claim 2, wherein, in association with receiving the downloaded content, additional information is received through the network interface.

10. The system of claim 9, wherein the additional information is related to the downloaded content.

11. The system of claim 10, wherein the additional information comprises one or more of a checksum, an encryption key, a decryption key, transaction-related information, time-related information, location-related information, and digital rights management information.

12. A method of storing downloaded content, comprising:
receiving downloaded content into a host device through a network interface;
transmitting the downloaded content through a peripheral interface to an optical disk drive connected to the host device;
writing the downloaded content, using the optical disk drive, onto a writeable optical disk, the writeable optical disk including a plurality of addressable units and a predetermined area for storing a data structure including a plurality of entries of pairs of identifying values and corresponding index values, and the downloaded content written to at least one addressable unit;
determining whether the host device or optical disk drive has previously written data to the writeable optical disk;
if the host device or optical disk drive has not previously written data to the writeable optical disk, storing an index value and a corresponding identifier value in the data structure, the identifier value uniquely identifying the host device or optical disk drive; and
writing the index value to the addressable unit to which the downloaded content is written, the index value being an index value from the data structure and corresponding to the host device or optical disk drive.

13. The method of claim 12, wherein the predetermined area is comprised in the addressable units.

14. The method of claim 12, wherein transmitting the downloaded content through a peripheral interface further comprises transmitting the downloaded content through an industry standard interface.

15. The method of claim 12, wherein transmitting the downloaded content through a peripheral interface further comprises transmitting the downloaded content through a proprietary interface.

16. The method of claim 12, wherein writing the downloaded content onto a writeable optical disk further comprises writing the downloaded content onto a rewriteable optical disk.

17. The method of claim 12, wherein writing the downloaded content onto a writeable optical disk further comprises writing the downloaded content onto a write-once optical disk.

18. The method of claim 12, further comprising receiving additional associated information through the network interface.

19. The method of claim 18, wherein the additional associated information is related to the downloaded content.

20. The method of claim 18, wherein receiving additional associated information further comprises receiving one or more of receiving a checksum, receiving an encryption key, receiving a decryption key, receiving transaction-related information, receiving time-related information, receiving location-related information, and receiving digital rights management information.

* * * * *